(12) United States Patent
Hochmuth

(10) Patent No.: US 6,508,347 B1
(45) Date of Patent: Jan. 21, 2003

(54) CLAMP ROLLER RATCHET MECHANISM

(75) Inventor: Harald Hochmuth, Hagenbuchach (DE)

(73) Assignee: Ina Walzlager Schaeffler oHG (DE)

( * ) Notice: Subject to any disclaimer, the term of this patent is extended or adjusted under 35 U.S.C. 154(b) by 0 days.

(21) Appl. No.: 09/856,410

(22) PCT Filed: Nov. 6, 1999

(86) PCT No.: PCT/EP99/08525

§ 371 (c)(1),
(2), (4) Date: Aug. 2, 2001

(87) PCT Pub. No.: WO00/32956

PCT Pub. Date: Jun. 8, 2000

(30) Foreign Application Priority Data

Nov. 27, 1998 (DE) .......................................... 198 54 945

(51) Int. Cl.[7] .......................... F16D 41/00; F16D 41/10; F16D 41/06
(52) U.S. Cl. .............................. 192/44; 192/43; 192/38; 192/223.2; 297/362
(58) Field of Search .............................. 192/19, 38, 43, 192/44, 47, 223.2; 297/362

(56) References Cited

U.S. PATENT DOCUMENTS

| | | | |
|---|---|---|---|
| 2,273,646 A | | 2/1942 | Johnson |
| 3,302,760 A | | 2/1967 | Taylor |
| 5,025,902 A | * | 6/1991 | Imai et al. .................. 180/249 |
| 5,248,017 A | * | 9/1993 | Schwarzbich ............... 188/134 |
| 5,593,210 A | * | 1/1997 | Schwarzbich ............ 192/223.2 |
| 5,794,479 A | * | 8/1998 | Schwarzbich ............ 192/223.2 |
| 6,032,777 A | * | 3/2000 | Denis ...................... 192/223.2 |

FOREIGN PATENT DOCUMENTS

| | | |
|---|---|---|
| DE | 804876 | 7/1949 |
| DE | 1106138 | 12/1956 |
| DE | 3616164 | 11/1987 |
| DE | 9408426 | 8/1995 |
| DE | 4447480 | 6/1996 |
| DE | 19518424 | 11/1996 |
| EP | 0497007 | 8/1992 |
| EP | 0631901 | 1/1995 |

* cited by examiner

Primary Examiner—Richard M. Lorence
Assistant Examiner—Eric M. Williams
(74) Attorney, Agent, or Firm—Bierman, Muserlian and Lucas

(57) ABSTRACT

The present invention concerns a clamping roller switch gear (1) whose drive element (10) can be displaced in opposite directions out of an idling, initial position by actuation of a pivoting lever (3). A driven element (coupling ring 15) of the clamping roller switch gear (1) and the drive element (10) define, together with opposing clamping surfaces, wedge-shaped clamping gaps (37, 38) that taper in opposite directions. In these clamping gaps (37, 38) are arranged clamping rollers (39) that, in the initial position of the drive element (10), are kept out of clamping engagement with the clamping surfaces by a first housing-fixed stop (42). According to the invention, the drive element (10) comprises two drive members (13, 14) that are rotatable in opposite directions, in the initial position of the drive element (10), these drive members are supported on housing-fixed stops, and the pivoting lever (3) positively entrains one of the drive members (13) in one direction of pivot and positively entrains the other drive member (14) in the opposite direction of pivot.

15 Claims, 4 Drawing Sheets

CLAMP ROLLER RATCHET MECHANISM

The present invention concerns a clamping roller switch gear which is classed as an infinitely variable step-by-step switch gear. A drive element and a driven element define, together with opposing clamping surfaces, wedge-shaped clamping gaps which taper in opposite directions and in which clamping rollers are arranged. Housing-fixed stops are provided which keep the clamping rollers disengaged from the clamping surfaces when the drive element of the clamping roller switch gear is not activated. In this way, it is assured that the driven element is rotatable in an idling or in an initial position of the drive element. If the drive element is moved out of its initial or idling position, the drive element effects a work stroke. The return movement of the drive element into the initial position is an idling stroke during which the driven element is not activated. During the work stroke of the drive element in the one direction, the one damping rollers are brought into clamping engagement with the clamping surfaces, while the respective other clamping rollers are fixedly supported on the housing and remain disengaged from the clamping surfaces. During the idling stroke, those clamping rollers that were previously clamped are disengaged from the clamping surfaces due to the reversal of movement, while the other clamping rollers remain supported on the housing-fixed stops and disengaged from the clamping surfaces even during the idling stroke. Therefore, no entrainment of the driven element takes place during the idling stroke.

BACKGROUND OF THE INVENTION

A clamping roller switch gear is known, for example, from EP 0 631 901 B1. This document discloses an adjusting device, particularly for adjusting a seat of a motor vehicle. In this device, a clamping roller switch gear (FIGS. 2 and 3 of EP 0 631 901 B1) and a clamping roller locking gear (FIG. 13 of EP 0 631 901 B1) are coupled to each other. FIG. 2 of EP 0 631 901 B1 shows the clamping roller locking gear in an initial position in which the pivoting lever is not actuated, and FIG. 3 of EP 0 631 901 B1 shows the pivoting lever displaced in one direction up to the end of its work stroke. The clamping roller switch gear comprises an inner element that engages into an opening of the pivoting lever. The clamping rollers are arranged in an annular space defined by the pivoting lever and the inner element. By an appropriate configuration of the recess, the annular space is radially constricted at a plurality of circumferentially spaced sections. The clear distance between the cylindrical peripheral surface of the inner element and the wall of the recess in these sections is smaller than the diameter of the clamping rollers. In this way, wedge-shaped clamping gaps are formed into which the clamping rollers are biased by compression springs. The clamping rollers are pressed against housing-fixed stops that are provided between every two adjacent clamping rollers. The tapered ends of the wedge-shaped clamping gaps. of the two clamping rollers face each other. The housing-fixed stops are dimensioned so that the clamping rollers are not in clamping engagement with their clamping surfaces. If, as shown in FIG. 3 of EP 0 631 901 B1, the pivoting lever is displaced in clockwise direction out of its initial position, those clamping rollers are drawn into their clamping gaps whose tapered ends are oriented in anti-clockwise direction. Now, an entrainment of the inner element takes place. During this entrainment, the compression springs arranged between every two clamping rollers are compressed till the spring coils come to bear against each other as a block. In the block state of the compression springs, the work stroke of the pivoting lever is terminated. During the work stroke, the respective other clamping rollers remain supported on the housing-fixed stops, and both the inner element and the pivoting lever are displaced past these clamping rollers that are supported on the housing-fixed stops. A possible drawback of this arrangement is that the clamping rollers supported on the housing-fixed stops during the work stroke get pressed against the wall of the recess or against the peripheral surface of the inner element, for example, due to the spring force. This friction contact is a drawback because, among other things, it considerably increases the force required for carrying out a work stroke. If such a clamping roller switch gear is used in a height adjusting device of a motor vehicle seat, for example, it is desirable that the seat height adjusting operation runs smoothly and with ease. A further possible drawback of this prior art is that clamping rollers that are supported on the housing-fixed stops during the work stroke may be forced out of their clamping gaps. This means that guides for the clamping rollers would have to be provided adjacent the clamping gaps.

SUMMARY OF THE INVENTION

The object of the present invention is therefore to provide a clamping roller switch gear according to the preamble of claim 1 wherein the clamping rollers that are supported on housing-fixed stops during the work stroke remain in their clamping gaps. The invention achieves this object by the fact that the drive element comprises two drive members that are rotatable in opposite directions, in the initial position of the drive element, both these drive members are supported on housing-fixed stops, and when the pivoting lever is pivoted out of its initial position in one direction of pivot it positively entrains one of the two drive members and when pivoted out of its initial position in the opposite direction of pivot, the pivoting lever positively entrains the other of the two drive members. The invention therefore achieves that the clamping rollers supported on housing-fixed stops during the work stroke remain fixedly supported on the housing together with their drive member. This means that the released clamping rollers do not leave their clamping gap. The clamping gap can be dimensioned so that the clamping rollers that are fixedly supported on the housing remain out of contact with the driven element that is rotated during the work stroke. Advantageously, compression springs may be arranged in the clamping gaps and be supported at one end on the drive member and at the other end on the clamping roller, and the spring force of these springs presses the clamping rollers against the first housing-fixed stop. According to a further advantageous feature of the invention, the first housing-fixed stop has a concave contour matched to the peripheral surface of the clamping rollers so that the clamping rollers are perfectly retained on this concave contour. Thus, in the initial position of the clamping roller switch gear, the clamping rollers are gripped between these springs and the first housing-fixed stops. Undesired chattering noises are thus totally excluded.

Each of the drive members comprises at least one clamping ramp forming one of the clamping surfaces, and the wedge-shaped clamping gaps defined by the clamping ramps of one of the drive members taper in the one direction, while the clamping gaps defined by the clamping ramps of the other drive member taper in the opposite direction. This assures that an entrainment of the driven element is possible in both directions of rotation. Preferably, the tapered ends of two adjacent wedge-shaped clamping gaps, each of which is defined by one of the two drive members, are oriented towards each other, and the first housing-fixed stop engages between the two wedge-shaped clamping gaps thus keeping the clamping rollers that are arranged in these clamping gaps out of clamping engagement in the idling initial position of the drive element. The first housing-fixed stops can be formed, for example, by tongues fixed on a housing.

Preferably, the drive element comprises a switch disk that is connected rotationally fast to the pivoting lever and that entrains one of the drive members in the one direction, and the other drive member in the other direction. The switch disk can comprise slots, for example, into which pins fixed on the drive members engage. In the initial position of the pivoting lever, the pins of the one drive member bear against one end of the slots and the pins of the other drive member bear against an opposite end of the slots. Only one pin engages into each slot. When the pivoting lever is displaced, one of the two drive members, depending on the direction of pivot, is positively entrained.

According to a further particularly advantageous feature of the invention, in the idling initial position of the drive element, one drive member is pressed by spring force against a second housing-fixed stop and the other drive member is pressed by spring force against a third housing-fixed stop. In this way, for example, undesired chattering noises of the drive members are excluded. These additional housing-fixed stops can be formed, for example, in that the mentioned pins of the drive members engage into slots of the housing. In the initial position of the pivoting lever, the pins of one of the drive members bear against one end of the slots and the pins of the other drive member bear against an opposite end of the slots. Only one pin engages into each slot. The spring force can be further used for biasing the drive members out of their displaced positions into their initial positions under the action of the spring force. This means that a pivoting of the pivoting lever is effected in opposition to this spring force, and releasing the pivoting lever has the consequence that the pivoting lever is biased into its initial position by this spring force.

The two drive members can be mounted axially behind each other for pivoting about a common axis of pivot. This arrangement makes it possible to arrange a plurality of circumferentially spaced, radially projecting fingers on each of the drive members with at least one finger of the one drive member and at least one finger of the other drive member engaging with switching clearance in peripheral direction between two circumferentially adjacent fingers of the respective other drive member. The switching clearance is dimensioned so that the angle of pivot between these inter-engaging fingers just about corresponds to the maximum work stroke of the pivoting lever. In this arrangement, it is possible without any problem to configure the inter-engaging fingers so that the finger of the drive member that is displaced through a switching stroke comes to abut against an adjacent finger of the other drive member that is supported on its housing-fixed stop. In contrast to the prior art discussed above, the end of the work stroke is not determined by a block state of springs but by positive stops without the danger of damage to a spring.

According to another advantageous feature of the invention, a compression spring is arranged between every two adjacent inter-engaging fingers, with one end of the springs being supported on one of the fingers, and the other end of the springs being supported on the other finger. These compression springs bias the two drive members against their associated second and third housing-fixed stops. Although the spring force of only one compression spring can already be sufficient, it can be appropriate in some cases to arrange a plurality of springs between every two inter-engaging claws. In this way, the total spring force is increased by the spring force of each additionally provided spring.

According to a further proposition of the invention, the driven element comprises an annular driven member having a cylindrical clamping track defined on its inner peripheral surface. In this arrangement, the aforesaid fingers of the two drive members can comprise the clamping ramps which together with the cylindrical clamping track of the annular driven member define the wedge-shaped clamping gaps.

According to still another proposition of the invention, the clamping roller switch gear is arranged in a housing fixed to a frame, the driven member being mounted in the housing through a radial bearing. For one thing, the housing therefore assumes the function of protecting the clamping roller switch gear from the ingress of undesired foreign matter and for another, it serves for the described radial mounting. A particularly simple radial bearing can be formed in that the driven member comprises a circumferentially extending sliding bearing surface that is radially mounted on the inner wall of the housing which is likewise configured as a sliding bearing surface.

Sliding bearing surfaces can be configured on the fingers of the drive members and be in sliding contact with a sliding bearing surface configured on the inner peripheral surface of the driven member. In this simple manner, the drive member can be radially mounted and centered relative to the driven member.

The sliding bearings primarily serve the purpose of centering. The sliding bearing surfaces can therefore also be designated as centering surfaces that are suitable for sliding contact. The outer peripheral surface of a cylinder, for example, that is in line contact with another outer peripheral surface can also be considered as a centering surface in the present context.

BRIEF DESCRIPTION OF THE DRAWINGS

The invention will be described in the following with reference to two examples of embodiment represented in a total of seven figures.

DETAILED DESCRIPTION OF THE DRAWINGS

Figure 1:
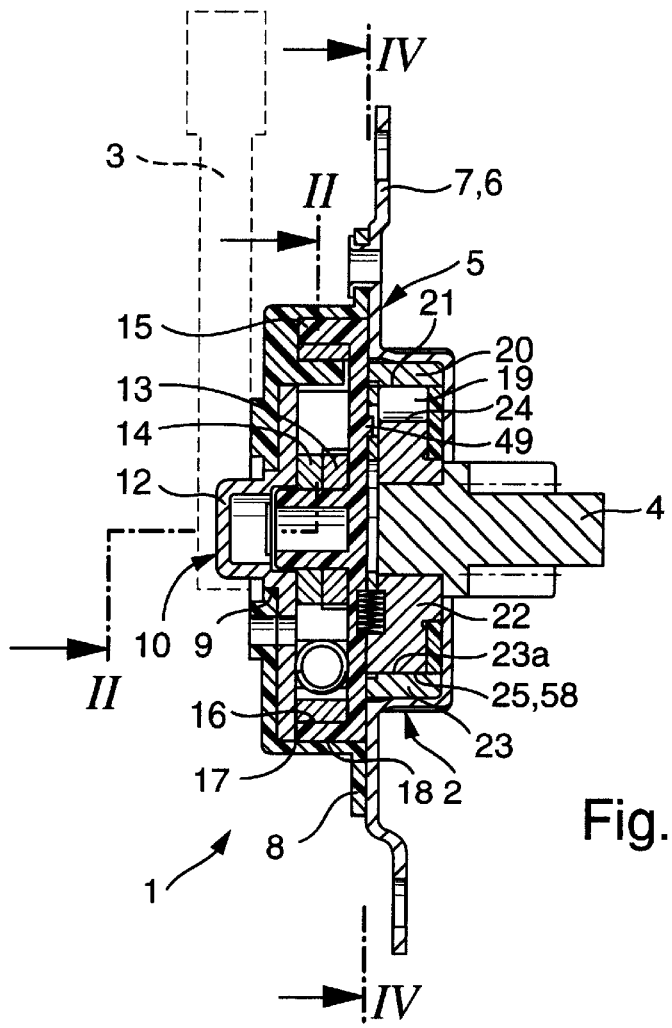
FIG. 1 is a longitudinal section through an adjusting device having a clamping roller switch gear according he invention.

FIG. 1 shows an adjusting device for adjusting a seat of a motor vehicle. A clamping roller switch gear 1 according to the invention and a switchable clamping roller locking gear 2 are coupled to each other in such a manner that a pivoting motion of a pivoting lever 3 is transmitted through the clamping roller switch gear 1 to a driven shaft 4 of the switchable clamping roller locking gear 2. The clamping roller switch gear 1 according to the invention and the switchable clamping roller locking gear 2 are arranged in a common housing 5. The housing 5 generally comprises a housing bottom 6 with screwing flanges 7 and further comprises a housing cover 8 which, in the present example of embodiment, is made of a plastic. The housing cover 8 comprises an opening 9 for a drive element 10 of the clamping roller switch gear 1. The housing bottom 6 comprises a further opening 11 for the driven shaft 4 of the switchable clamping roller locking gear 2.

The drive element 10 comprises a switch disk 12 that is connected rotationally fast to the pivoting lever 3. The drive element 10 further comprises two drive members 13, 14 that are connected to the switch disk 12 for pivoting motion. The drive element 10 also comprises a coupling ring 15 that connects the clamping roller switch gear 1 and the switchable clamping roller locking gear 2 to each other for the transmission of a pivoting motion. A cylindrical inner wall of the housing cover 8 and a cylindrical outer peripheral surface of the coupling ring 15 are configured as sliding bearing surfaces 16, 17 that are in sliding contact with each other. In this way, a radial bearing 18 is formed on which the coupling ring 15 is mounted radially on the housing 5, and the radial bearing 18 prevents a tilting of the coupling ring 15. The axis of rotation of the radial bearing 18 coincides with the axis of rotation of the two drive members 13, 14, with that of the switch disk 12 and with that of the pivoting lever 3 as well as with that of the driven shaft 4 of the switchable clamping roller locking gear 2.

Clamping rollers 19 are arranged between the driven shaft 4 of the clamping roller locking gear 2 and the housing 5. A clamping ring 20 is connected rotationally fast to the housing 5, and the inner peripheral surface of the clamping ring 20 defines a cylindrical clamping track 21 for the clamping rollers 19. The driven shaft 4 comprises a plurality of circumferentially spaced cams 22 whose peripheral surfaces are configured as sliding surfaces 23 which are in sliding contact with the inner peripheral surface of the clamping ring 20, which surface is configured as a sliding bearing surface 23a. The driven shaft 4 further comprises a plurality of circumferentially spaced clamping ramps 24 which, together with the cylindrical clamping track 21 of the clamping ring 20 form wedge-shaped clamping gaps into which the clamping rollers 19 are spring-biased. The radial bearing 25 formed by the sliding bearing surfaces 23 of the cams 22 and the sliding bearing surface 23a of the clamping ring 20 serves for the radial mounting of the driven shaft 4 in the housing 5, and this radial bearing 25 is configured so that a tilting of the driven shaft 4 is excluded. The inner peripheral surface of the clamping ring 20 serves both as a sliding bearing surface 21 and as a clamping track.

Figure 2:
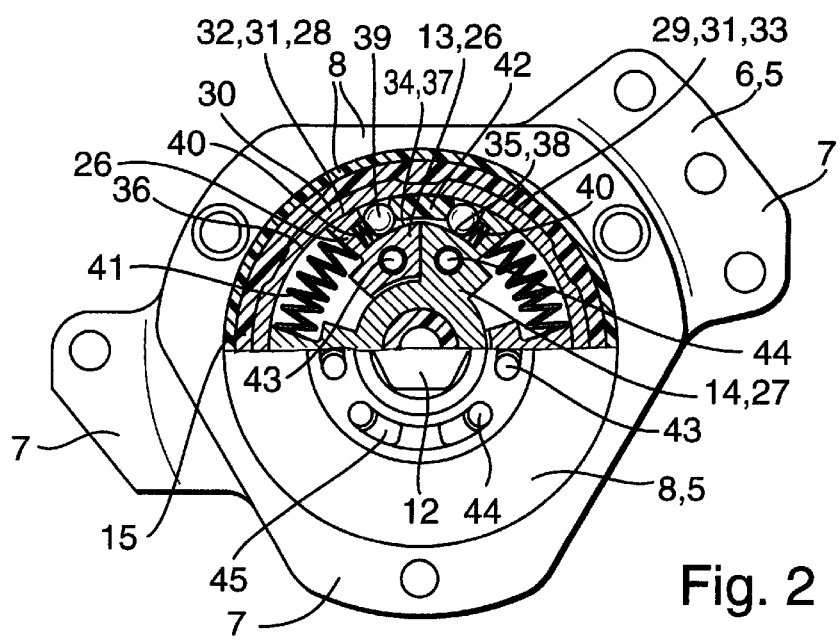
FIG. 2 is a cross-section through the adjusting device of FIG. 1 taken along line II—II.

FIG. 2 shows a cross-section taken along the line II—II. Clearly to be seen are the two drive members 13, 14 that are arranged axially behind each other. Each of the drive members 13, 14 comprises three circumferentially equi-spaced fingers 26, 27 which engage each other in peripheral direction with switching clearance. The two drive members 13, 14 can be rotated against each other till the inter-engaging fingers 26, 27 come to abut against each other. Each of the drive members 13, 14 is radially mounted and centered on the coupling ring 15 through a radial bearing 28, 29. For this purpose, a ring 30 is fixed rotationally fast to the coupling ring 15 and its inner peripheral surface forms a sliding bearing surface 31. The peripheral surfaces of the fingers 26, 27 comprise respective sliding bearing surfaces 32, 33 which are in sliding contact with the sliding bearing surface 31 of the ring 30. Adjacent fingers 26, 27 of the drive members 13, 14 comprise clamping ramps 34, 35 which together with the inner peripheral surface of the ring 30 which is configured as a cylindrical clamping track 36 define wedge-shaped clamping gaps 37, 38 in which clamping rollers 39 are arranged. The clamping rollers 39 are biased by compression springs 40 into their wedge-shaped clamping gaps 37, 38. The compression springs 40 are supported at one end on a finger 26 or 27 and at the other end, on a clamping roller 39. Further compression springs 41 are arranged between adjacent fingers 26, 27 of the two drive members 13, 14. These compression springs 41 are supported at one end on one of these fingers and at the other end, on the other of these fingers 26 and 27.

Figure 3:
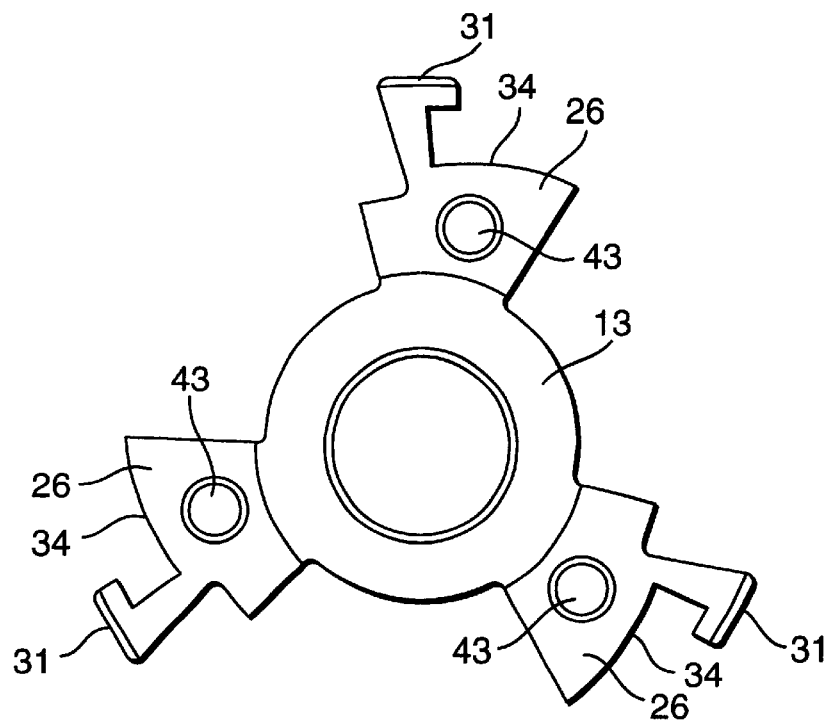
FIG. 3 is a view of a drive member.

Tongues 42 that are fixedly connected to the housing cover 8 engage between two adjacent clamping rollers 39 and form a support for these clamping rollers 39. The tongues 42 are dimensioned so that in the position illustrated in this figure, the clamping rollers 39 are disengaged from the clamping ramps 34, 35 and from the cylindrical clamping track 36. These tongues 42 define first housing-fixed stops. Each of the drive members 13, 14 is fixedly connected to pins 43, 44 that protrude from an end face thereof and engage into slots 45 of the housing cover 8. These pins 43, 44 also engage into slots of the switch disk 12 as will be described more particularly below. FIG. 3 is a detail drawing of the drive member 13.

Figure 4:
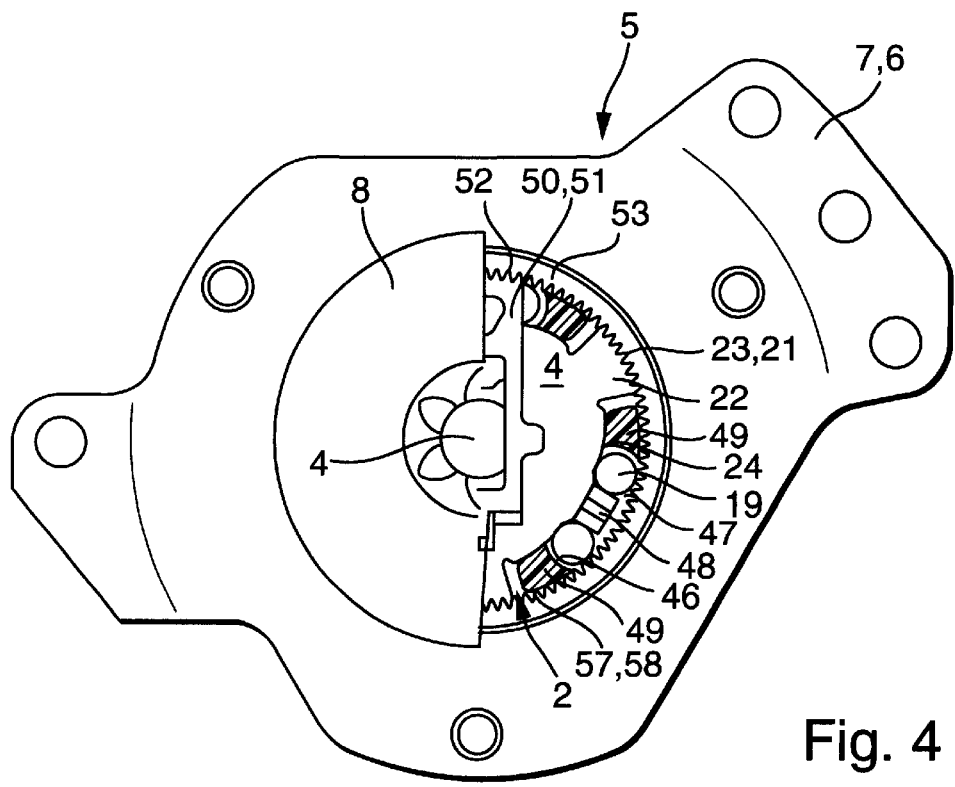
FIG. 4 is a further cross-section taken along line IV—IV through the adjusting device shown in FIG. 1.

FIG. 4 shows a semi-section taken along line IV—IV of FIG. 1 and gives a clear view of the switchable clamping roller locking gear 2. The clamping rollers 19 are biased by compression springs 48 into their wedge-shaped clamping gaps 46, 47 that are defined by the clamping ramps 24 and the cylindrical clamping track 21. Claws 49 that are fixedly connected to the coupling ring 15 engage between the clamping rollers 19.

Further, an anti-slip device 50 is provided that comprises a slide 51 that is rotationally fixed to the driven shaft 4 but is radially movable. Teeth 52 of the slide 51 can be made to mesh with a rim gear 53 of the housing 5.

Figure 5:
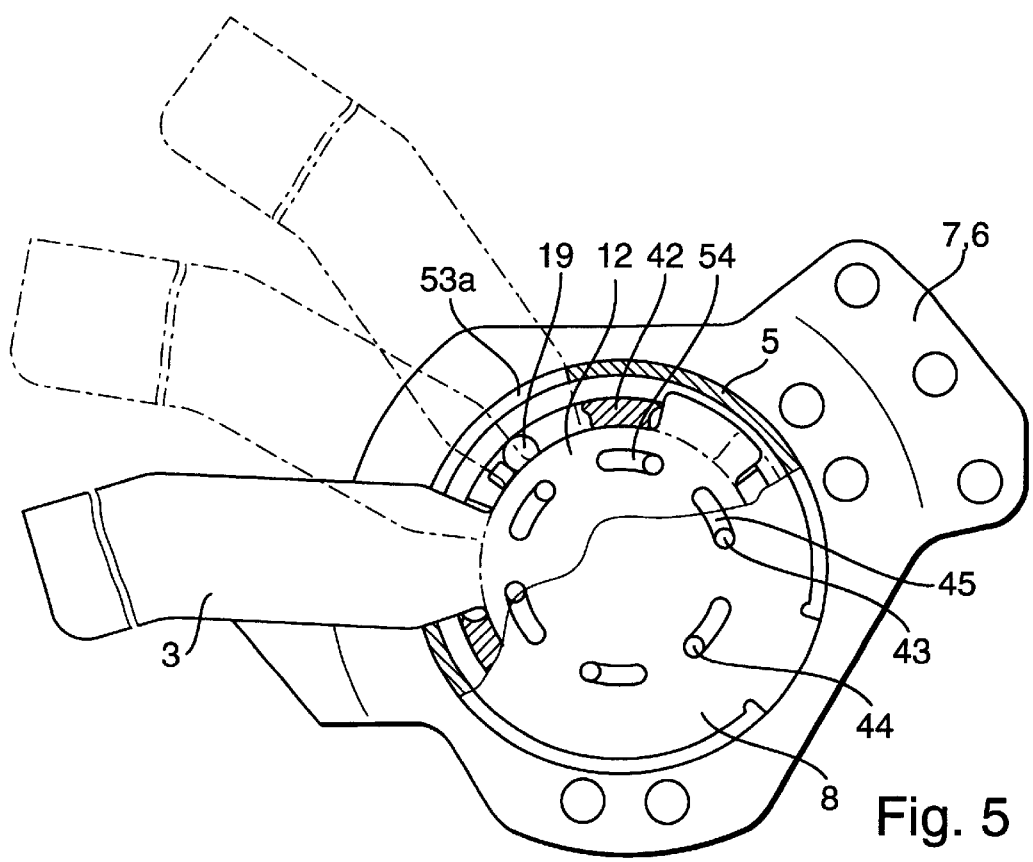
FIG. 5 is a cross-section through a further adjusting device.

FIG. 5 shows a further adjusting device which differs from the adjusting device described above mainly in that the pivoting lever 3 is made in one piece with the switch disk 12, the pivoting lever 3 being inserted radially through a slit 53a of the housing 5. The housing cover 8 has been partly broken off so that the switch disk 12 with the slots 54 can be clearly seen. In this figure, the slots 54 provided in the switch disk 12 for engagement by the pins 43, 44 are distinctly illustrated.

Three positions of the pivoting lever 3 are represented in this FIG. 5. The central, initial position of the pivoting lever 3 is shown in broken lines. From this position, the pivoting lever 3 can be displaced both in clockwise and in anticlockwise direction. A displacement of the pivoting lever 3 out of the initial position effects a work stroke and a return movement into the initial position effects an idling stroke. The power generated by the actuation of the pivoting lever 3 is transmitted during the work stroke to the driven shaft 4 of the clamping roller locking gear 2.

Figure 6:
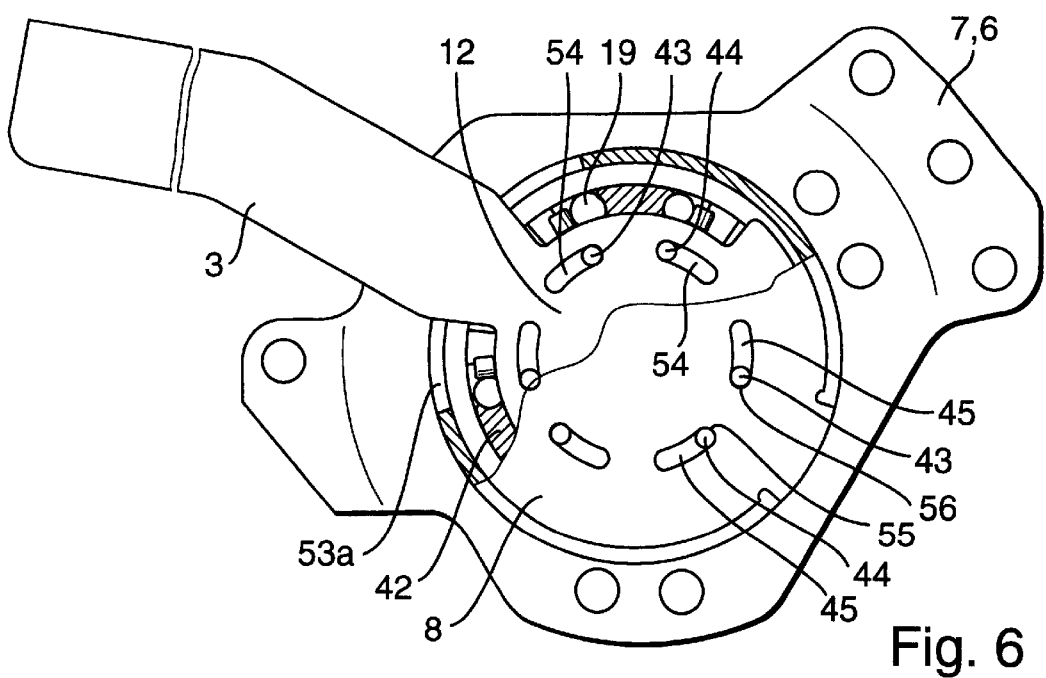
FIG. 6 shows the adjusting device of FIG. 5, but with the pivoting lever in an initial position.

The manner in which this power transmission is effected by the clamping roller switch gear according to the invention is explained in the following with reference to FIGS. 2, 5, 6 and 7. FIG. 6 shows the seat adjusting device of the invention of FIG. 5, but with the pivoting lever 3 in its initial position. Under the action of the compression springs 41 described above, the pins 43, 44 of the two drive members 13, 14 are biased against housing-fixed stops. The pins 44 are biased in anti-clockwise direction against the ends of the slots 45, so that these ends define second housing-fixed stops 55. The pins 43 of the drive member 13 are biased in clockwise direction against the other ends of the slots 45 so that these ends define third housing-fixed stops 56. Either a pin 43 of the drive member 13 or a pin 44 of the drive member 14 engages into each slot 45.

The slots 54 of the switch disk 12 are dimensioned so that in the initial position of the pivoting lever 3, the pins 43, 44 likewise bear against ends of the slots 54. In this way, the initial position of the pivoting lever 3 is distinctly defined. In this figure, the slots 45, 54 of the housing cover 8 and the switch disk 12 are situated exactly on top of each other.

Figure 7:
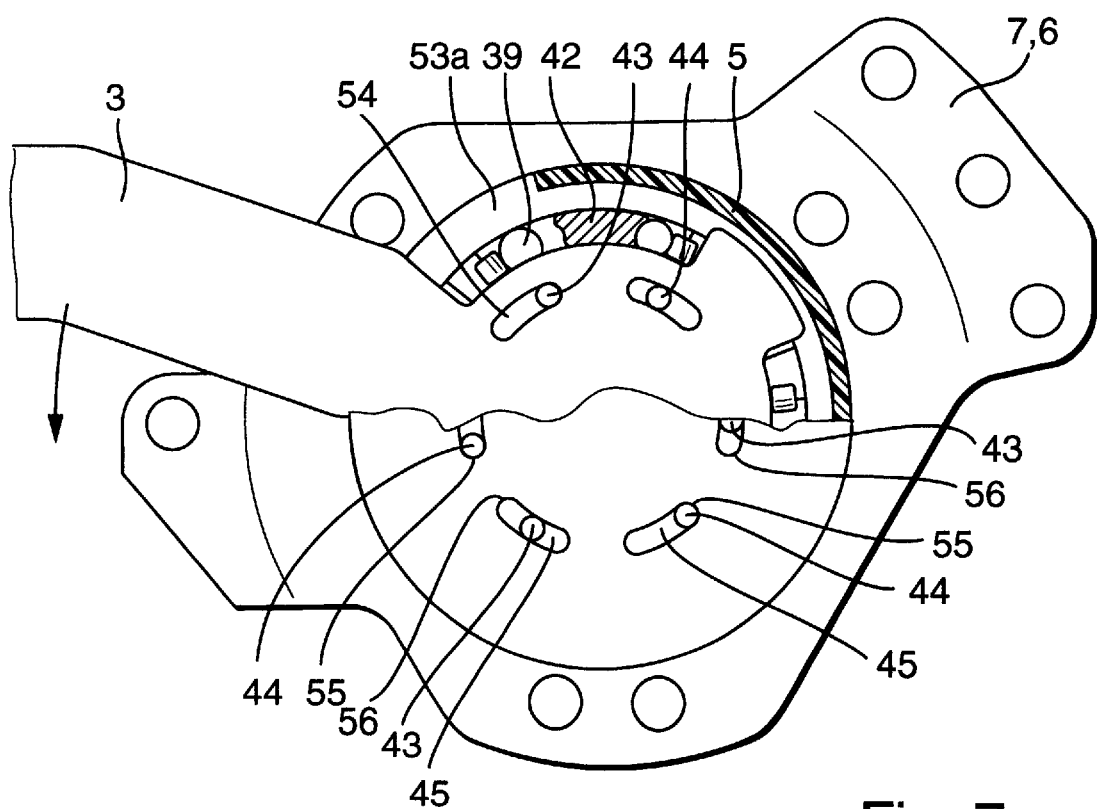
FIG. 7 is a view of the adjusting device similar to FIG. 6, but with the pivoting lever in a pivoted position.

FIG. 7 shows the adjusting device of FIG. 6, but with the pivoting lever moved out of its initial position in anti-clockwise direction, the end of the work stroke not yet being reached. It can be clearly seen in this figure that the pins 43 are positively entrained by the pivoting lever 3 because each of them bears against the end of a slot 54 of the switch disk 12. This means that the drive member 13 is likewise positively entrained. Since a relative movement now takes place between the drive member 13 and the coupling ring 15, the clamping rollers 39 of the clamping roller switch gear 1 are drawn into their wedge-shaped clamping gaps 37. For this reason, the coupling ring 15 pivots together with the drive member 13 and the pivoting lever 3. Due to the pivoting of the coupling ring 15, its claws 49 at first come to abut against the clamping rollers 19 of the switchable clamping roller locking gear 2 and release the clamping rollers 19 from clamping engagement. Following this, the claws 49 abut against further stops, not shown, of the driven shaft 4 so that the driven shaft 4 is positively rotated.

During this work stroke, the pins 44 and thus the drive member 14 remain supported on the second housing-fixed stops 55. As a result of this work stroke, the compression springs 41 are compressed because the drive member 13 is pivoted relative to the drive member 14 that is fixedly supported on the housing. The end of the work stroke (FIG. 7) is reached when the fingers 26 of the drive member 13 come to abut against the fingers 27 of the drive member 14. At the end of the work stroke, the compression springs 41 are not yet compressed to block size.

During the work stroke, the clamping rollers 39 associated to the drive member 14 that is fixedly supported on the housing remain in their wedge-shaped clamping gaps 38 and are supported at one end on the housing-fixed tongues 42 and at the other end, on the compression springs 40. The housing-fixed tongues 42 are dimensioned so that the clamping rollers 39 remain free of clamping engagement. If the pivoting lever 3 is now released, it springs back into its initial position under the spring force of the compressed compression springs 41. These compression springs 41 relax till the pins 43 of the drive member 13 come to re-abut against their third housing-fixed stops 56. During this idle stroke, no rotation of the coupling ring 15 takes place because, due to the relative motion between the drive member 13 and the coupling ring 15, the previously clamped clamping rollers 39 are pressed into their wedge-shaped clamping gaps 37 so that a clamping engagement is impossible. A renewed displacement of the pivoting lever 3 in anti-clockwise direction effects a further rotation of the coupling ring 15 and thus of the driven shaft 4. For the functioning of the adjusting device of the invention, it is not necessary to carry out a complete work stroke. For example, the pivoting lever 3 may be displaced only through half of its possible work stroke. Corresponding to this, the entrainment of the coupling ring 15 and the driven shaft 4 is also reduced. If the pivoting lever 3 is released out of this intermediate position, it springs back into its initial position under the spring force of the compression springs 41.

A rotation of the driven shaft 4 in the opposite direction is possible when the pivoting lever 3 is displaced in clockwise direction out of its initial position. The transmission of power is effected in the same manner as described above.

A torque introduced into the driven shaft 4 from the outside in the initial position of the pivoting lever 3 is transmitted to the housing 5 by the clamping rollers 19 clamped in each case.

To prevent the clamped clamping rollers 19 of the clamping roller locking gear 2 from coming briefly loose from clamping engagement under the influence of vibrations, and thus possibly leading to a relative rotation between the housing 5 and the driven shaft 4, the anti-slip device 50 mentioned above is provided. When the pivoting lever 3 is in its initial position, the teeth 52 of the slide 51 are meshed with the rim gear 53. Thus, there is a positive connection between the driven shaft 4 and the housing 5. When the pivoting lever 3 is actuated, the slide 51 is moved radially inwards by a switching mechanism so that the teeth 52 are released from the meshed engagement with the rim gear 53.

The described radial bearings also serve to center the mounted parts. The pins 43, 44 and the slots 54 of the switch disk 12 can be matched to one another in a manner that permits a perfect centering of the switch disk 12 by the pins 43, 44.

The claws 49 of the coupling ring 15 bear with their outer peripheral surfaces against the housing-fixed cylindrical clamping track 21 of the clamping roller locking gear 2 (FIG. 4). In this way, it is assured that the claws 49 are perfectly centered and thus also perfectly oriented relative to the clamping rollers. Since the peripheral surfaces of the claws 49 slide along the cylindrical clamping track 21, these peripheral surfaces define sliding bearing surfaces 57 which, together with the cylindrical clamping track 21, form a radial bearing 58.

LIST OF REFERENCE NUMERALS

1 Clamping roller switch gear
2 Switchable clamping roller locking gear
3 Pivoting lever
4 Driven shaft
5 Housing
6 Housing bottom
7 Screwing flange
8 Housing cover
9 Opening
10 Drive element
11 Opening
12 Switch disk
13 Drive member
14 Drive member
15 Coupling ring
16 Sliding bearing surface
17 Sliding bearing surface
18 Radial bearing
19 Clamping roller
20 Clamping ring
21 Cylindrical clamping track
22 Cam
23 Sliding bearing surface
23a Sliding bearing surface
24 Clamping ramp
25 Radial bearing
26 Finger 27 Finger
28 Radial bearing
29 Radial bearing
30 Ring
31 Sliding bearing surface
32 Sliding bearing surface
33 Sliding bearing surface
34 Clamping ramp
35 Clamping ramp
36 Cylindrical clamping track
37 Clamping gap
38 Clamping gap
39 Clamping roller
40 Compression spring
41 Compression spring
42 Tongue
43 Pin
44 Pin
45 Slot
46 Clamping gap
47 Clamping gap
48 Compression spring
49 Claw
50 Anti-slip device
51 Slide
52 Tooth
53 Rim gear
53a Slit
54 Slot
55 Second stop
56 Third stop
57 Sliding bearing surface
58 Radial bearing

What is claimed is:

1. A clamping roller switch gear (1) comprising a drive element (10) that can be displaced in opposite directions out of an idling, initial position by actuation of a pivoting lever (3), said clamping roller switch gear (1) further comprising a driven element (5), said drive and driven elements defining together with mutually opposing clamping surfaces, wedge-shaped clamping gaps (37, 38) that taper in opposite directions and in which clamping rollers (39) are arranged that, in the initial position of the drive element (10) are kept out of clamping engagement with the clamping surfaces by a first housing-fixed stop (42), characterized in that the drive element (10) comprises two drive members (13, 14) that are rotatable in opposite directions, in the initial position of the drive element (10) both these drive members (13, 14) are supported on housing-fixed stops, and the pivoting lever (3) positively entrains one of the drive members (13) in one direction of pivot and positively entrains the other of the drive members (14) in the opposite direction of pivot.

2. A clamping roller switch gear according to claim 1, wherein each of the drive members (13, 14) comprises at least one clamping ramp (34, 35) that forms one of the clamping surfaces, and the clamping gaps (37) defined by the clamping ramps (34) of one drive member (13) taper in one direction and the clamping gaps (38) defined by the clamping ramps (35) of the other drive member (14) taper in the opposite direction.

3. A clamping roller switch gear according to claim 1, wherein a switching disk (12) is connected rotationally fast to the pivoting lever and positively entrains one drive member (13) in one direction and positively entrains the other drive member (14) in the other direction.

4. A clamping roller switch gear according to claim 2, wherein the clamping rollers (39) associated to the respective entrained drive member (13, 14) are in clamping engagement with the clamping surfaces, the driven element (15) being displaced together with the drive member (13, 14), and the clamping rollers (39) associated to the respective other drive member (13, 14) in each case are held out of clamping engagement with the clamping surfaces by the first housing-fixed stop (42).

5. A clamping roller switch gear according to claim 1, wherein the tapered ends of two adjacent wedge-shaped clamping gaps (37, 38), each of which is defined by one of the drive members (13, 14), face each other, the first housing-fixed stop (42) engages between the two wedge-shaped clamping gaps (37, 38) and, in the idling, initial position of the drive element, keeps the clamping rollers (39) that are arranged in the two wedge-shaped clamping gaps (37, 38) out of clamping engagement (10).

6. A clamping roller switch gear according to claim 1, wherein, in the idling, initial position of the drive element (10), one of the drive members (14) is biased under spring force against a second housing-fixed stop (55) and the other drive member (13) is biased under spring force against a third housing-fixed stop (56).

7. A clamping roller switch gear according to claim 6, wherein both the drive members (13, 14) are biased out of a displaced position into their initial position under the action of the spring force.

8. A clamping roller switch gear according to claim 1, wherein the two drive members (13, 14) are arranged axially behind each other for pivoting about a common axis of pivot.

9. A clamping roller switch gear according to claim 8, wherein each of the two drive members (13, 14) comprises a plurality of circumferentially spaced fingers (26, 27) with at least one finger (26, 27) of the one drive member (13, 14) and at least one finger (26, 27) of the other drive member (13, 14) engaging with switching clearance in peripheral direction between two circumferentially adjacent fingers (26, 27) of the respective other drive member (13, 14).

10. A clamping roller switch gear according to claim 9, wherein the finger (26, 27) of the drive member (13, 14) that is displaced through a switching stroke comes to abut against an adjacent finger (26, 27) of the other drive member (13, 14) that is supported on its housing-fixed stop (55, 56).

11. A clamping roller switch gear according to claim 10, wherein a compression spring (41) is arranged between every two adjacent inter-engaging fingers (26, 27), one end of the compression spring (41) being supported on one of the fingers (26) and the other end of the compression spring (41) being supported on the other of the fingers (27).

12. A clamping roller switch gear according to claim 1, wherein the driven element (10) comprises an annular driven member (15) on whose inner peripheral surface is configured a cylindrical clamping track (36) that defines the clamping surface.

13. A clamping roller switch gear according to claim 12, wherein the fingers (26, 27) of the two drive members (13, 14) comprise the clamping ramps (34, 35) that together with the cylindrical clamping track (36) of the annular driven member (15) define the wedge-shaped clamping gaps (37, 38).

14. A clamping roller switch gear according to claim 1 arranged in a housing (5) that is fixed to a frame, wherein the driven member (15) is mounted in the housing (5) through a radial bearing (18).

15. A clamping roller switch gear according to claim 13, wherein the driven member (15) comprises a circumferentially extending sliding bearing surface (32) that is radially mounted on the inner wall of the housing (5), which inner wall is configured as a sliding bearing surface (31).

* * * * *